Figure 1:
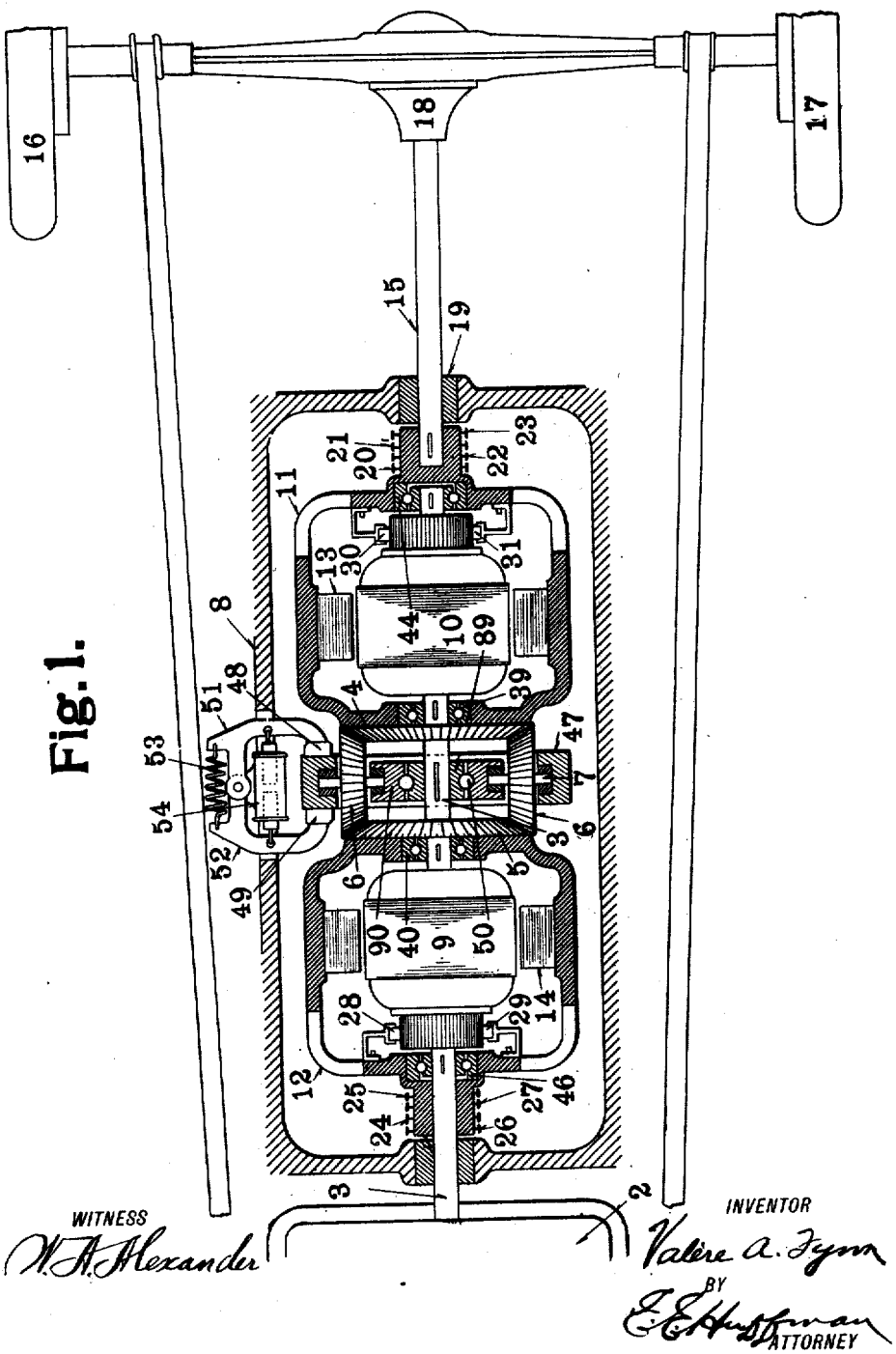

V. A. FYNN.
ELECTROMAGNETIC TRANSMISSION APPARATUS.
APPLICATION FILED MAY 9, 1916.

1,284,304.

Patented Nov. 12, 1918.
3 SHEETS—SHEET 1.

WITNESS
W. H. Alexander

INVENTOR
Valere A. Fynn
BY
E. E. Huffman
ATTORNEY

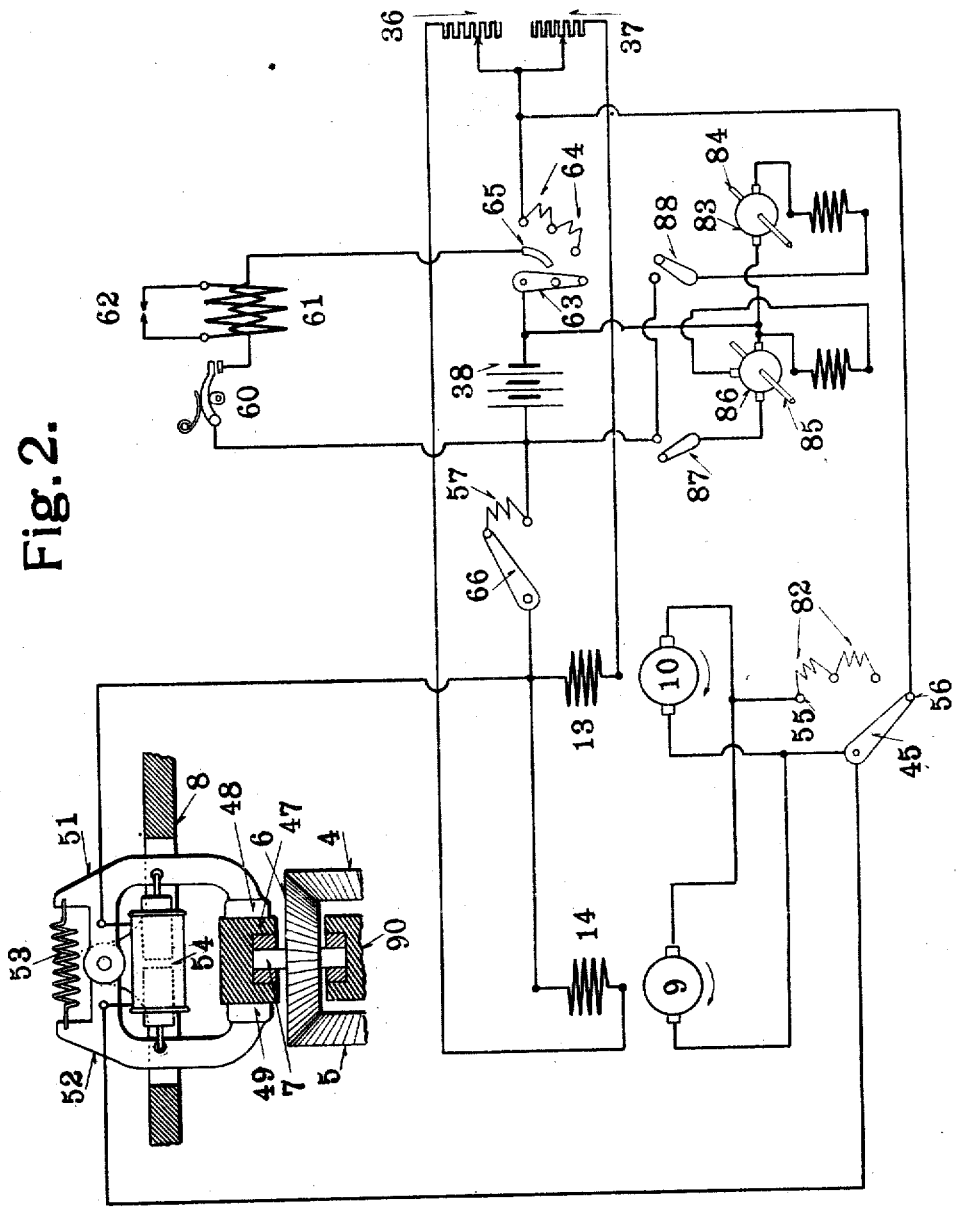

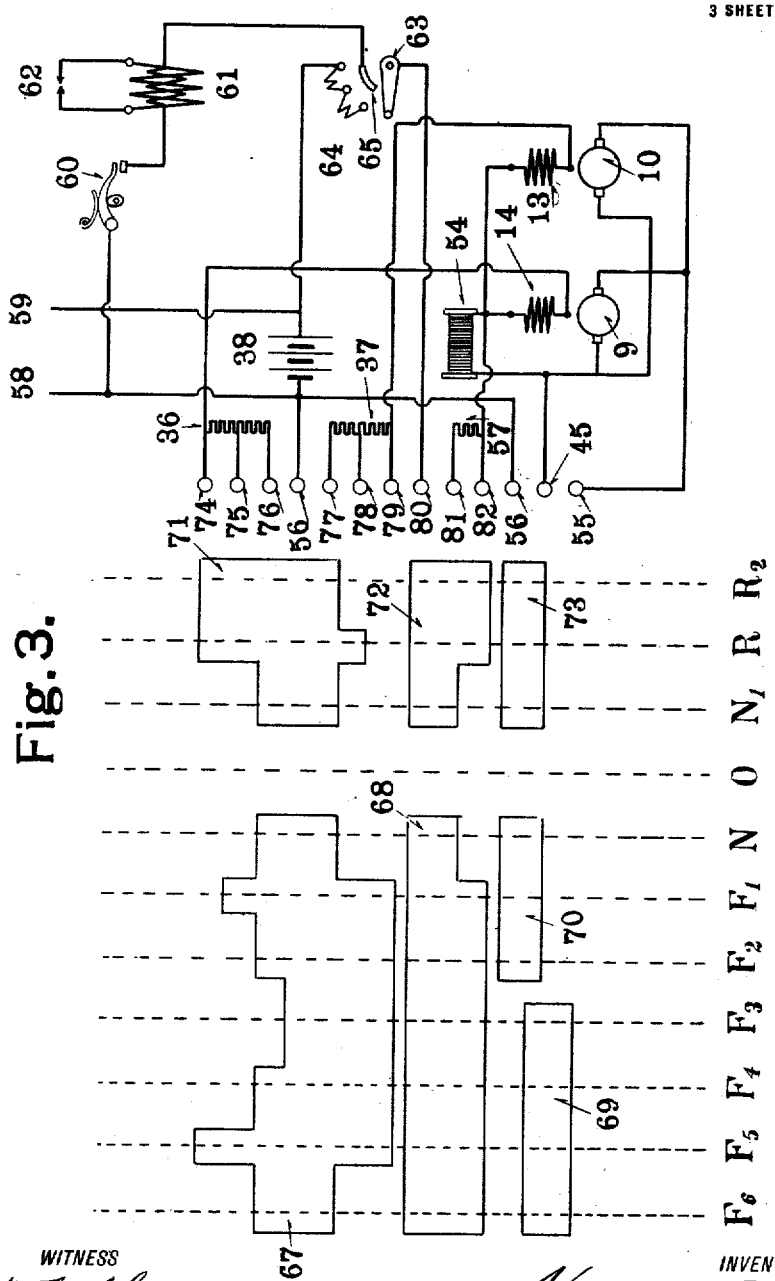

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ELECTROMAGNETIC TRANSMISSION APPARATUS.

1,284,304.  Specification of Letters Patent.  Patented Nov. 12, 1918.

Application filed May 9, 1916. Serial No. 96,284.

*To all whom it may concern:*

Be it known that I, VALÈRE A. FYNN, a subject of the King of England, residing at the city of St. Louis, State of Missouri, United States of America, have invented a certain new and useful Electromagnetic Transmission Apparatus, of which the following is such a full, clear, and exact description as will enable any one skilled in the art to which it appertains to make and use the same, reference being had to the accompanying drawings, forming part of this specification.

My invention relates to electromagnetic mechanism by means of which the power delivered by a prime mover can be efficiently transmitted to a driven member at different speed and torque factors independently of the speed and torque at which the prime mover delivers its energy. It relates particularly to that type of apparatus in which two dynamo electric machines are made use of, both elements of which are rotatable.

In all prior arrangements of above character with which I am acquainted, gearing of one sort or another formed part of the apparatus, being located between the engine and the two members driven thereby and between the driven shaft and the two members driving same, or between the two members driving the driven shaft. In all these schemes the elements of said gearing are always in motion, even when the electromagnetic apparatus is transmitting power at practically the same speed at which it is delivered by the prime mover. This condition is often objectionable in the case of automobiles, as gear wheels are likely to produce noise.

One of the objects of my invention is to do away with the possibility of noise under direct drive conditions, by excluding all relative motion between the gear wheels.

In all the electromagnetic transmission apparatus known to me, which comprise two or more dynamo electric machines, only one of these can be utilized as a dynamo electric coupling on direct drive, the other being idle at such times or put to some auxiliary use for instance as charging the starting and lighting battery, which does not utilize its capacity to anything like the full extent.

Another object of my invention is to make efficient use of the apparatus as a whole by causing both dynamo electric machines to act as dynamo electric couplings on direct drive, instead of utilizing only one of them for this purpose. The weight of the whole outfit is thereby reduced and its efficiency increased.

Other objects and advantages of my invention will be apparent from the following description and the accompanying diagrammatic drawings, in which Figure 1 shows the mechanical features of my invention as applied to one form of electric transmission apparatus; Fig. 2 is an enlarged view of part of the mechanism together with one way of making the necessary electrical connections; and Fig. 3 shows a complete controlling scheme as applied to the device illustrated in Fig. 1.

Referring more particularly to Fig. 1, the shaft 3 of the prime mover 2 carries the two armatures 9, 10, of the two dynamo electric machines forming part of my improved transmission. These armatures are keyed to the shaft 3. Centered on this shaft by means of the bearings 40 and 46 is a field structure 12 carrying field winding 14 adapted to coöperate with the armature 9. Another like field structure 11 is centered on the shaft 3, at 39 and 44, and carries field winding 13, coöperating with the armature 10. To each of these field structures is attached a bevel-wheel, as shown at 4 and 5. These bevel-wheels coöperate with the bevel pinions 6, the shanks 7 of which are held in suitable bearings located in the rings 47 and 90. The ring 90 forms one race of a ball bearing 50, the other race 89 of which is keyed to the shaft 3. The brake shoes 48, 29, coacting with the ring 47, are held by scissors-like arms 51, 52, controlled by a spring 53 and an electromagnet 54. The spring tends to hold the brake shoes 48, 49 off the ring 47, thus leaving it and the pinion 6 free to revolve on the bearing 50. The electromagnet 54 tends to press the brake shoes 48, 49 into contact with the ring 47 and thus hold same in place. Radial grooves may be cut in the sides of the ring 47 into which the brake shoes 48, 49 will slip, and thus hold same against further rotation more securely and with less effort on the part of the electromagnet. This part of the mechanism is shown on a larger scale in Fig. 2. The bevel pinions 6 are free to revolve on their shanks. The rotatable field structure 11 is connected to the driven shaft 15, which is supported in a bearing 19 of the frame 8. The shaft 15 drives the vehicle wheels 16 and 17 through the differential 18.

The brushes 28, 29, coöperating with the commutator for the armature 9, are supported on the field structure 12 and revolve therewith. The brushes 30, 31, coöperating with the commutator for the armature 10, are supported by the field structure 11 and revolve with same. Because both elements of each of the dynamo electric machines are rotatable, slip rings 24, 25, 26 27, are provided on field structure 12, and slips 20, 21, 22, 23, on field structure 11, so as to allow of electrical access to the armatures as well as to the field coils.

Fig. 2 shows one way of making the necessary electrical connections. The two armatures 9, 10, which are directly connected to the prime mover and are always driven in a clockwise direction as seen from the engine end, are permanently connected in circuit with each other. Their respective field windings 14, 13, are adapted to be so connected in circuit with a storage battery 38 as to cause the E. M. F's generated in the armature circuit to oppose each other. The current sent into 14 can be regulated by means of the adjustable resistance 36, and that sent into 13, by means of the adjustable resistance 37. Within this exciting circuit is located a resistance 57 controlled by the switch 66, by means of which the current in both field windings can be simultaneously increased or decreased. Another resistance 64, controlled by the switch 63, is similarly located, but the switch lever 63 not only varies the resistance 64 but is also adapted to make or break the ignition circuit of the prime mover, which, in the case of automobiles, is almost always an internal combustion engine. This ignition circuit, which is fed from the storage battery 38, comprises the cam-controlled interrupter 60, the ignition coil 61, and the spark gap or gaps 62. The circuit of the electromagnet 54, which is fed by the storage battery 38, is controlled by the switch 45, which is also adapted to short circuit each of the armatures 9 and 10, or to insert the resistance 82 in each of the armature circuits. The storage battery 38 can be connected to a source of current 86 from which the storage battery can be charged. In practice this source may take the form of a suitably controlled or suitably designed dynamo electric generator having a shaft 85 driven by the prime mover. When the prime mover is an internal combustion engine, then an electric motor 83 will be provided, as is now usual, for the purpose of cranking the engine by means of the shaft 84, the energy required by the motor for this purpose being derived from the storage battery 38.

The mode of operation of my improved electromagnetic transmission apparatus is as follows:

Assuming the dynamo electric machine to be identical, switches 45, 66, 63, can be in their "off" positions and the exciting circuits can also be interrupted at the resistances 36 and 37. Or, switch 45 may stand on point 56, switch 66 may be placed so as to include the resistance 57 in the battery circuit, and the switches controlling the resistances 36 and 37 so placed as to make the current in the two exciting windings 13, 14, equal as soon as the exciting circuit is closed. In either case it is necessary in order to start the engine, to close switch 63, and it is better, although not necessary, to cut out all the resistance 64 in so doing. This action closes the ignition circuit. The engine may now be started by means of the starting motor 83, and the latter can be disconnected as soon as the engine begins to fire. With the engine running within its operating range of speed, the charging generator 86 it drives will be in a position to charge the battery 38. With the engine running in a clockwise direction, there will be relative movement between the armatures 9, 10, and their respective field structures 12, 11. If the exciting circuits are interrupted at the resistances 36, 37, nothing will, of course, happen, because there will be no current within the armature circuit. Nor will a current appear within the armature circuit if the switches coöperating with the resistances 36 and 37 are so placed as to make the excitation of 13 equal to that of 14, for then the armatures will be generating equal and opposite E. M. F's. The apparatus can, therefore, not transmit power when the exciting circuits are open or when they carry equal exciting currents. The next step is to cut out the resistance 57 and the resistances 36 and 37, also the resistance 64, if this has not been previously done. Under these conditions the fields 13 and 14 will be at their maximum strength, and the electromagnet 54 will be fully excited, thus holding the ring 47 and the pinions 6 journaled therein, stationary, without however preventing said pinions from revolving on their axes 7. If it be desired to start the vehicle in the one or the other direction with a powerful torque and at slow speed, it is necessary to reduce the field strength of one of the dynamo electric machines with respect to that of the other, the direction of rotation depending on which field strength is reduced. If the current in winding 13 is weakened, then the driven shaft will rotate in counter-clockwise direction, driving the car say backward. If the current through 14 is weakened, then the driven shaft will rotate in a clockwise direction, driving the car forward. The maximum speed of rotation in either direction will be reached when the excitation of one of the field structures is reduced to zero.

Suppose that the vehicle is running forward and the c... ...tion of 14 is reduced to zero, then the field structure 11 will be revolving at nearly the same speed as the armature 10, slipping just enough to send that current through the resistance of the armature circuit which will enable the apparatus to overcome the resistance of the driven shaft. At this time the field structure 12 is inactive, but is driven in a counter-clockwise direction by the element 11 through the gear wheels 4 and 5 and the pinions 6. The speed of 12 is the same as the speed of 11, but it revolves in the opposite direction, so that while the relative speed between 10 and 11 is almost nil, that of 9 and 12 is almost equal to double the engine speed.

When this condition is reached, switch 45 should be removed from point 56 to point 55. This interrupts the circuit of the electromagnet 54 and short circuits each of the armatures 9 and 10 on itself, thus reducing the resistance through which the torque-producing current must circulate, thereby somewhat raising the efficiency of the apparatus and the speed of the vehicle. But the interruption of the circuit of the electromagnet 54 places spring 53 in control of the brake shoes 48, 49, and releases the ring 47, thus allowing the pinions 6 to revolve about the axis 3. The next step is to slightly excite the field structure 12 by again closing the circuit of 14 over sufficiently high resistances. This will cause the armature 9 and the field 12 to coöperate as a short circuited generator, with the result that the speed of 12 will be rapidly reduced and its direction of rotation reversed. As the excitation of 14 is increased, so will the speed of 12 increase, in a clockwise direction, and when it is made equal to the excitation of 13 both machines will be acting as dynamo electric couplings, the torques of both field structures being in a clockwise direction. It will be observed that when the bevel wheels 4 and 5 both exert a clockwise or both exert a counter-clockwise torque of equal magnitude, this fact alone locks the pinions 6, and these then merely act as mechanical couplings between the two field structures. In this way relative motion between the teeth of the bevel wheels is eliminated and all noise due to this cause is thus prevented. Furthermore, the whole of the apparatus is fully utilized, because both dynamo electric machines do duty as couplings, each transmitting about one-half of the engine torque to the driven shaft.

When both dynamo electric machines are made use of as couplings, it will often be desirable, for instance when running the car through dense traffic, to momentarily reduce the speed of the vehicle by "slipping the clutch." This can be readily achieved by simultaneously reducing the excitation of both dynamo electric machines, thus increasing the slip between the armatures and the coöperating field magnets, and hence reducing the speed of the driven shaft with respect to that of the driving shaft. A similar effect can be produced by inserting resistance into each armature circuit, as shown at 82 in Fig. 2, and without changing the field excitation of the two machines.

It has been previously stated that the transmission is inactive, either when the excitation of the two field structures is nil, or when they are equally excited. If the "off" position is to provide for equal excitation, in which case it can be referred to as the "neutral" position, then, for the purposes of economy, it is better to reduce this excitation to a small amount. For this reason I have provided the resistance 57, and I prefer to also include the whole of the resistances 36 and 37. Since the interruption of a shunt circuit always produces a more or less vicious spark, it will, no doubt, be preferable in most cases to so arrange the "off" position that the excitations of the two units are equal and not to make use of an "off" position in which the exciting circuit is interrupted. The purpose of the resistance 64 is to interrupt the exciting circuit under the best possible conditions when the engine is to be stopped. To this end the resistance 64 is given a high value, and the switch 63 should not occupy any intermediate position. It is either to be placed in the "off" position, in which the exciting as well as the ignition circuit is interrupted, or in the "on" position, in which the ignition circuit is closed and the resistance 64 is all cut out of the exciting circuit.

In Fig. 3 is shown a controller suitable for carrying out the operations just described in their proper sequence. The rotatable drum of this controller carries the contact plates 67, 68, 69, 70, 71, 72, 73, and they coöperate with the stationary contact fingers, 45, 55, 56 and 74 to 82, the various positions of these fingers relatively to the contact plates being indicated by dotted lines $F_1$ to $F_6$, N, O, $N_1$, $R_1$ and $R_2$. This controller has an "off" position O, in which all the exciting circuits are interrupted. If it be desired to substitute what may be called a "neutral" position, that is one in which the fields 13 and 14 are equally excited, then the O position and one of the N positions can be eliminated and the controller simplified to that extent.

If the controller is moved from the position O into position $N_1$ then the positive pole of the battery connected to fingers 56 will be connected by means of the plate 71 and the contact fingers 76, 77 to the ends of the exciting windings 14 and 13, through the resistances 36 and 37. With the ignition switch 63 closed, as it will be when the engine is running, the negative pole of the battery will at the same time be connected to the other ends of the exciting windings 14, 13 through the resistance 57, by means of the contact fingers 80, 81 and the contact plate 72. The circuit of the electromagnet 54 will simultaneously be closed at the points 45, 56, by means of the plate 73. If the controller be now moved to the position $R_1$, then the resistance 57 will be cut out of the exciting circuit by means of the plate 72, all of the resistance 36 in the exciting circuit 14 will be short circuited, while only part of the resistance in the exciting circuit 13 is cut out by the contact plate 71. This unequal excitation will cause a counter-clockwise rotation of the driven shaft 15 and a backward motion of the vehicle. Moving the controller to the position $R_2$ will further decrease the excitation of 13, thus increasing the speed of the backward motion of the vehicle.

If on the other hand the controller is moved in the opposite direction, to the position N, no motion will result, because the organization of circuits in the position N is identical with that prevailing in position $N_1$. But if the controller be moved to the position $F_1$, then the resistance 57 is cut out of the exciting circuit by means of the plate 68, the whole of the resistance 37 is short circuited, thus making the excitation of 13 a maximum while a part of the resistance 36 is left in circuit with the winding 14 thus weakening the excitation of 14 with respect to that of 13. This condition results in a forward motion of the vehicle, and this forward motion is accelerated when the controller is placed in the position $F_2$, for the reason that the excitation of 14 is still further reduced thereby. When the controller is moved to position $F_3$, the excitation of 14 is entirely interrupted at the contact finger 76, the circuit of the electromagnet 54 is simultaneously interrupted at the point 45 and the armatures 9 and 10 are individually short circuited at the points 45 and 55 by means of the contact plate 69. The demagnetization of the electromagnet 54 releases the bevel wheel 6 as will be remembered, so that when the controller is moved to the position $F_4$ and the winding 14 is again lightly excited, the speed of rotation of the field structure 12 is first reduced and then its direction of rotation is reversed, when it begins to operate as a dynamo electric coupling, in the same manner in which the other dynamo electric machine is operating. By placing the controller in the position $F_5$, the field structure 12 becomes fully excited and both dynamo electric machines contribute to the propulsion of the vehicle to the same degree. This position corresponds to the "direct drive" in an automobile of ordinary construction. Should it now be desired to momentarily increase the slip between the armatures and the corresponding field structures, thus reducing the speed of the driven shaft as compared to the speed of the driving shaft, then the controller may be placed in position $F_6$, in which the excitation of both machines is reduced by the same amount.

While I have indicated very few subdivisions of the various regulating resistances, it will be well understood that in practice a greater number of such subdivisions will be used, so as to make the change of speed to be obtained by the movement of the controller, more gradual. This increase in the number of contacts does not in any way affect the principle illustrated in Fig. 3, in which the number of contacts has been kept down to a minimum for the sake of clearness.

Having fully described my invention, what I claim as new and desire to secure by Letters Patent of the United States is:

1. In an apparatus for the character described, the combination of a prime mover, a driven shaft, two dynamo electric machines both members of each machine being rotatable, one member of each machine being connected to the prime mover and the other members of said machines being mechanically connected together and to the driven shaft, said connecting means comprising a pinion journaled in a movable bearing, and means for holding said bearing stationary.

2. In an apparatus of the character described, the combination of a prime mover, a driven shaft, two dynamo electric machines, both members of each machine being rotatable, one member of each machine being connected to the prime mover and the other members of said machines being mechanically connected together and to the driven shaft, said connecting means comprising a pinion journaled in a movable bearing, and electromagnetically controlled means for holding said bearing stationary.

3. In an apparatus of the character described, the combination of a prime mover, a driven shaft, two dynamo electric machines, both members of each machine being rotatable, one member of each machine being connected to the prime mover and the other members of said machines being mechanically connected together and to the driven shaft, said connecting means comprising a pinion journaled in a movable bearing, and means for holding said bearing stationary, said means being normally in inoperative position.

4. In an apparatus of the character described, the combination of a prime mover, a driven shaft, two dynamo electric machines, both members of each machine being rotatable, one member of each machine being connected to the prime mover and the other members of said machines being mechanically connected together and to the driven shaft, said connecting means comprising a pinion journaled in a movable bearing, means for holding said bearing stationary, said means being normally in inoperative position, and means for operating the holding means.

5. In an apparatus of the character described, the combination of a prime mover, two dynamo electric machines, both members of each machine being rotatable, one member of each machine being mounted on a shaft driven by the engine, and the other members of said machines being mechanically connected together, said connecting means comprising a pinion, and a revoluble bearing for said pinion, said bearing being mounted on the engine driven shaft.

6. In an apparatus of the character described, the combination of a prime mover, a driven shaft, two dynamo electric machines, both members of each machine being rotatable, one member of each machine being connected to the prime mover and the other members of said machines being mechanically connected together and to the driven shaft, said connecting means comprising a pinion journaled in a movable bearing, means for holding said bearing stationary, and a controller for operating said holding means.

7. In an apparatus of the character described, the combination of a prime mover, a driven shaft, two dynamo electric machines both members of each machine being rotatable, one member of each machine being connected to the prime mover and the other members of said machines being mechanically connected together and to the driven shaft, said connecting means comprising a pinion journaled in a movable bearing, means for holding said bearing stationary, and a controller for varying the relative torques per ampere of said machines and for operating the holding means.

8. In an apparatus of the character described, the combination of a prime mover, a driven shaft, two dynamo electric machines, both members of each machine being rotatable, one member of each machine being connected to the prime mover and the other members of said machines being connected to the driven shaft, connections whereby one of said machines may supply electrical energy to the other, and a controller for successively varying the relative excitations of said machines, short circuiting their armatures, and again varying the relative excitations.

9. In an apparatus of the character described, the combination of a prime mover, a driven shaft, two dynamo electric machines, both members of each machine being rotatable, one member of each machine being connected to the prime mover and the other members of said machines being connected to the driven shaft, connections whereby one of said machines may supply electrical energy to the other, and a controller adapted to successively reduce the excitation of one machine, short circuit the armatures of both machines and then increase the excitation of said last mentioned machine.

10. In an apparatus of the character described, the combination of a prime mover, a driven shaft, two dynamo electric machines, both members of each machine being rotatable, one member of each machine being connected to the prime mover and the other members of said machines being connected to the driven shaft, and means for causing both machines to simultaneously act as generators and transmit torque to the driven shaft.

11. In an apparatus of the character described, the combination of a prime mover, a driven shaft, two dynamo electric machines, both members of each being rotatable, one member of each machine being connected to the prime mover to rotate in the same direction, and the other members of said machines being connected to the driven shaft and to rotate in opposite directions, and means for causing said last named members to rotate in the same direction.

12. In an apparatus of the character described, the combination of a prime mover, a driven shaft, two dynamo electric machines, both members of each machine being rotatable, one member of each machine being connected to the prime mover and the other members of said machines being connected to the driven shaft, and a controller for establishing connections to cause the E. M. F. generated in either machine to exceed that generated in the other and to cause both members to simultaneously act as generators to transmit torque to the driven shaft.

13. In an apparatus of the character described, the combination of a prime mover, a driven shaft, two dynamo electric machines for transmitting power from the prime mover to the driven shaft, both members of each machine being rotatable, the members of one machine being adapted to rotate in the same direction and the members of the other to rotate in opposite directions, and means for causing the members of the last named machine to rotate in the same direction.

14. In an apparatus of the character described, the combination of a prime mover, a driven shaft, two dynamo electric machines, both members of each machine being rotatable, one member of each machine being connected to the prime mover and the other members of said machines being connected to the driven shaft, and a controller adapted when in one position to establish connections whereby the E. M. F. generated by one machine will be equal to the E. M. F. generated by the other, to establish connections whereby the E. M. F. generated in one machine will exceed that generated in the other when the controller is moved in one direction from said first named position, to establish connections whereby the E. M. F. generated by the first mentioned machine will be less than that generated in the other when the controller is moved in the opposite direction, to short circuit both machines, and to vary the E. M. F. generated by one machine while maintaining the short circuit connection.

In testimony whereof I have hereunto set my hand and affixed my seal.

VALÈRE A. FYNN. [L. S.]